(12) United States Patent
Kim

(10) Patent No.: US 11,910,961 B2
(45) Date of Patent: Feb. 27, 2024

(54) BIDIRECTIONAL SIMULTANEOUS ROTARY BLADE BUNDLE FOR MIXER

(71) Applicant: Cuckoo Electronics Co., Ltd., Yangsan-si (KR)

(72) Inventor: Youngjin Kim, Goyang-si (KR)

(73) Assignee: CUCKOO ELECTRONICS CO., LTD., Yangsan-si (KR)

( * ) Notice: Subject to any disclaimer, the term of this patent is extended or adjusted under 35 U.S.C. 154(b) by 453 days.

(21) Appl. No.: 17/414,728

(22) PCT Filed: Nov. 6, 2019

(86) PCT No.: PCT/KR2019/014935
§ 371 (c)(1),
(2) Date: Jun. 16, 2021

(87) PCT Pub. No.: WO2020/130337
PCT Pub. Date: Jun. 25, 2020

(65) Prior Publication Data
US 2022/0039601 A1 Feb. 10, 2022

(30) Foreign Application Priority Data
Dec. 17, 2018 (KR) .......... 10-2018-0163566

(51) Int. Cl.
A47J 43/00 (2006.01)
A47J 43/07 (2006.01)
A47J 43/08 (2006.01)

(52) U.S. Cl.
CPC ......... *A47J 43/0722* (2013.01); *A47J 43/085* (2013.01)

(58) Field of Classification Search
CPC .... A47J 43/085; A47J 43/0722; B01F 27/808
See application file for complete search history.

(56) References Cited

U.S. PATENT DOCUMENTS 3,202,007 A * 8/1965 Stratienko ............. A47J 43/085
74/413
5,535,665 A * 7/1996 Wong ..................... A47J 43/044
366/261

(Continued)

FOREIGN PATENT DOCUMENTS

CN 203041970 U 7/2013
CN 108991949 A 12/2018

(Continued)

OTHER PUBLICATIONS

The extended European search report of EP 19 89 9443, dated Jul. 25, 2022.

(Continued)

*Primary Examiner* — Faye Francis
(74) *Attorney, Agent, or Firm* — STIP Law Group, LLC

(57) ABSTRACT

Provided is a bidirectional simultaneous rotary blade bundle for a mixer, the bidirectional simultaneous rotary blade bundle including: a housing; a forward rotary shaft installed on the housing; a forward rotation blade provided on the forward rotary shaft; a central gear axially installed on the forward rotary shaft; horizontal insertion gears engaged with the central gear; a reverse rotor, of which inner gear teeth are engaged with and rotate on the outside of the horizontal insertion gears; and a reverse rotation blade installed on the reverse rotor, wherein the horizontal insertion gears are rotated in the reverse direction according to the forward rotation of the central gear such that the inner gear teeth are rotated in the reverse direction.

10 Claims, 8 Drawing Sheets

(56) References Cited

U.S. PATENT DOCUMENTS

| | | | | |
|---|---|---|---|---|
| 6,283,625 B2* | 9/2001 | Frankel | ................ | B01F 27/071 |
| | | | | 366/328.2 |
| 6,632,154 B2 | 10/2003 | Ushikoshi | | |
| 8,635,948 B2* | 1/2014 | Herren | ................. | A47J 43/046 |
| | | | | 241/199.2 |
| 9,149,156 B2* | 10/2015 | Rosenzweig | ........... | B01F 35/30 |
| 2007/0006739 A1* | 1/2007 | Fevre | ................... | A47J 43/085 |
| | | | | 99/348 |
| 2007/0122516 A1* | 5/2007 | Qian | ..................... | A21C 9/066 |
| | | | | 425/200 |
| 2013/0264405 A1* | 10/2013 | Audette | ............. | B01F 27/1123 |
| | | | | 366/279 |
| 2015/0003190 A1* | 1/2015 | Pendleton | ............ | B01F 27/951 |
| | | | | 366/314 |

FOREIGN PATENT DOCUMENTS

| | | |
|---|---|---|
| KR | 20140102128 | 8/2014 |
| KR | 101862587 | 5/2018 |
| KR | 102022492 | 9/2019 |

OTHER PUBLICATIONS

International Search Report—PCT/KR2019/014935 dated Feb. 6, 2020.

* cited by examiner

BIDIRECTIONAL SIMULTANEOUS ROTARY BLADE BUNDLE FOR MIXER

TECHNICAL FIELD

The present disclosure relates to a mixer.

BACKGROUND ART

Generally, a mixer is an electric machine for processing foods such as fruits, vegetables, grains, etc. by mincing, juicing, mixing, cutting (chopping), or grinding (hereinafter, referred to as "grind" for a convenience of explanation) so that the foods in various forms can be ingested.

Fundamentally, a mixer may include a motor housing in which a motor is installed, a container coupled to the motor housing and provided with a rotary blade that receives a rotational force of the motor, and a lid that opens and closes an upper end of the container.

The rotary blade constructed inside the container may be provided by being mounted on a rotary shaft of a blade bundle.

As the related art with respect to such a rotary blade, "A two way rotatable knife assembly for a mixer" that is Korean Patent No. 10-1862587 (published on May 31, 2018) filed and registered as a patent in Korea by the present applicant is disclosed.

By allowing two blades to be simultaneously rotated in opposite directions with one motor, "A two way rotatable knife assembly for a mixer" that is Korean Patent No. 10-1862587 was an innovative technology that is capable of realizing the same mixing effect as before revolutions per minute (RPM) of the motor was reduced by half even if the RPM of the motor was reduced by half.

However, "A two way rotatable knife assembly for a mixer" that is Korean Patent No. 10-1862587 has the following problems.

First, the technology of Korean Patent No. 10-1862587 adopted a plurality of driven gears so as to transfer a rotational force of a driving gear to a reverse rotation gear that is fastened to a reverse direction rotor, but the driven gears were inevitably eccentrically installed from the rotary shaft.

In the installation structure of the driven gear, since a power transmission process of the reverse direction was eccentric, overall rotation was inevitably eccentric to one side. As a result, problems may occur in rotational efficiency, rotational stability, and rotational reliability, and also there may be a problem of causing noise.

In addition, the technology of Korean Patent No. 10-1862587 requires a total of three steps, in which three steps are two steps of the driven gears and the reverse rotation gear, so as to transfer the rotational force of the driving gear to the reverse direction rotor, and also had to adopt the reverse rotation gear inevitably, the reverse rotation gear being screwed to the reverse direction rotor.

As described above, since the number of parts was increased due to the large number of gears that occupy a large volume in both horizontal and vertical directions and an assembly time was also increased, there was a problem in that a production cost of a product was increased, and also there was a problem of miniaturizing the product due to a problem of a large volume of a blade bundle.

DISCLOSURE

Technical Problem

Accordingly, the present disclosure has been made keeping in mind the above problems occurring in the related art, and the present disclosure is intended to propose a bidirectional simultaneous rotary blade bundle for a mixer, and the objectives are as follows:

First, the present disclosure provides a bidirectional simultaneous rotary blade bundle for a mixer, in which since inner gear teeth having a belt shape are formed at an inner circumferential surface of a reverse rotor and a plurality of horizontal insertion gears is provided between the inner gear teeth and a central gear and engaged with both the inner gear teeth and the central gear, an occurrence of an eccentric during a rotation is prevented so that a noise does not occur.

Second, the present disclosure provides a bidirectional simultaneous rotary blade bundle for a mixer, in which between the inner gear teeth of the reverse rotor and the central gear, the plurality of horizontal insertion gears is engaged with both the inner gear teeth and the central gear and arranged at equal intervals, and the horizontal insertion gears rotate the inner gear teeth in the same direction of a rotating direction of the horizontal insertion gears, so that a rotating balance of the reverse rotor and a forward shaft is automatically maintained, thereby having a stable and reliable rotation.

Third, the present disclosure provides a bidirectional simultaneous rotary blade bundle for a mixer, in which between the central gear and the inner gear teeth of the reverse rotor, only a horizontal insertion gear that is one power transmission member is adopted, so that steps of a reverse direction power transmission are minimized, thereby reducing both the number of parts and an assembly time of a product, resulting in reducing a production cost of the product.

Fourth, the present disclosure provides a bidirectional simultaneous rotary blade bundle for a mixer, in which by realizing the reverse direction rotation only with the horizontal insertion gear without adopting the large number of gears that occupy a large volume in both horizontal and vertical directions, a volume of the blade bundle is capable of being reduced and the mixer is capable of being miniaturized.

Technical Solution

In order to achieve the above objectives, according to one aspect of the present disclosure, there is provided a bidirectional simultaneous rotary blade bundle for a mixer, the blade bundle comprising: a housing having an upper through-hole and a lower through-hole; a forward rotary shaft installed through the housing by passing through the upper through-hole and the lower through-hole of the housing, and connected to a motor shaft of a motor of the mixer and configured to be rotated in a forward direction according to a rotation of the motor shaft; a forward rotation blade fixedly provided on an upper side of the forward rotary shaft; a first bearing axially installed on the forward rotary shaft; a central gear axially installed on the forward rotary shaft and configured to be rotated in the forward direction together with the forward rotary shaft; a plurality of horizontal insertion gears engaged with the central gear, provided at equal intervals to each other, and configured to be rotated in place in a reverse direction according to a rotation of the central gear, the reverse direction being opposite to a rotation direction of the central gear; a reverse rotor having inner gear teeth that are formed concentrically with the central gear and are formed in a belt shape along an inner circumferential surface of the reverse rotor in a circumferential direction, the inner gear teeth being engaged with the plurality of horizontal insertion gears externally, thereby the reverse rotor being configured to be rotated in the reverse direction according to a rotation of the horizontal insertion gears, the reverse direction being same as a rotation direction of the plurality of horizontal insertion gears; a second bearing axially installed on the reverse rotor at a position between the reverse rotor and the upper through-hole of the housing; and a reverse rotation blade installed on the reverse rotor and configured to be rotated in the reverse direction together with the reverse rotor, wherein the reverse rotor has an inner side in contact with an outer side of the first bearing and has an outer side in contact with an inner side of the second bearing, so that the reverse rotor is configured to be rotated by being rotatably disposed between the first bearing and the second bearing, and between the central gear and the inner gear teeth, the plurality of horizontal insertion gears is simultaneously engaged with both gear teeth of the central gear and the inner gear teeth, so that the plurality of horizontal insertion gears is configured to be rotated in the reverse direction according to the forward rotation of the central gear and configured to rotate the inner gear teeth in the same direction that is the reverse direction according to the reverse rotation of the plurality of horizontal insertion gears.

Advantageous Effects

The bidirectional simultaneous rotary blade bundle for the mixer of the present disclosure including the aforementioned configuration has the following effects.

First, in the present disclosure, since inner gear teeth having a belt shape are formed at an inner circumferential surface of a reverse rotor and a plurality of horizontal insertion gears is provided between the inner gear teeth and a central gear and engaged with both the inner gear teeth and the central gear, there is an advantage in that an occurrence of eccentricity during a rotation is prevented so that a noise does not occur.

Second, in the present disclosure, between the inner gear teeth of the reverse rotor and the central gear, the plurality of horizontal insertion gears is engaged with both the inner gear teeth and the central gear and arranged at equal intervals, and the horizontal insertion gears rotate the inner gear teeth in the same direction of a rotating direction of the horizontal insertion gears, so that there is an advantage in that a rotating balance of the reverse rotor and a forward shaft is automatically maintained, thereby having an advantage of a rotation with stable and reliable.

Third, in the present disclosure, between the central gear and the inner gear teeth of the reverse rotor, only horizontal insertion gear that is one power transmission member is adopted, so that there is an advantage in that steps of a reverse direction power transmission are minimized, thereby having an advantage of reducing both the number of parts and an assembly time of a product, resulting in an advantage of reducing a production cost of the product.

Fourth, in the present disclosure, by realizing the reverse direction rotation only with the horizontal insertion gear without adopting the large number of gears that occupy a large volume in both horizontal and vertical directions, there are advantages in that a volume of the blade bundle is capable of being reduced and the mixer is capable of being miniaturized.

MODE FOR INVENTION

Figure 1:
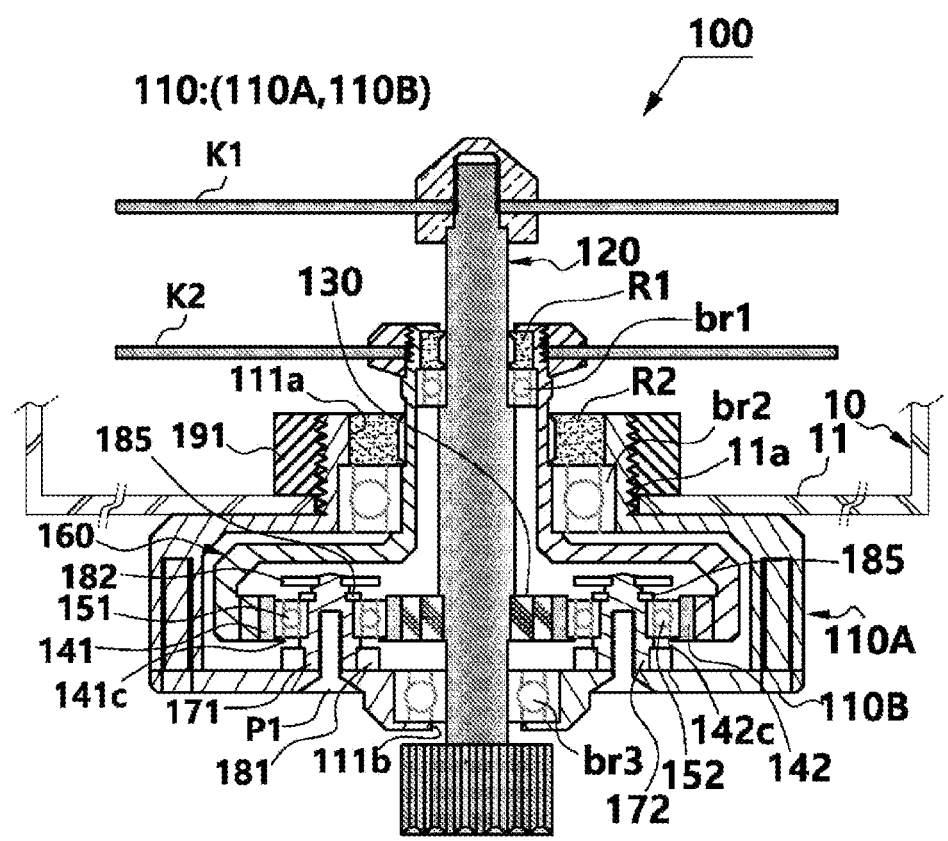
FIG. 1 is a cross-sectional side view illustrating a bidirectional simultaneous rotary blade bundle 100 for a mixer according to an embodiment of the present disclosure.

Hereinafter, a bidirectional simultaneous rotary blade bundle for a mixer according to a preferred embodiment of the present disclosure will be described in detail with reference to accompanying drawings.

The present disclosure relates to a mixer that may include: a container 10 having a cylindrical shape for containing foods including fruits, meats, vegetables, coffee, and grains; a motor housing (not illustrated) coupled to the container 10 at a position below the container 10; a motor (not illustrated) embedded in the motor housing (not illustrated) and configured to be rotatable at a position inside the motor housing;

and a blade bundle 100 configured to be rotated according to a rotation of the motor by receiving a rotational force of the motor and configured to cut, grind, or mill the foods existing in the container 10. Particularly, the present disclosure relates to the blade bundle 100 that is a key component of the mixer.

The container 10, the motor housing, and the motor are already known before applying the present disclosure and the detailed description thereof is omitted herein.

As illustrated in the drawings, the bidirectional simultaneous rotary blade bundle 100 for the mixer according to an embodiment of the present disclosure may include: a housing 110 having an upper through-hole 111*a* and a lower through-hole 111*b*; a forward rotary shaft 120 installed through the housing 110 by passing through the upper through-hole 111*a* and the lower through-hole 111*b* of the housing 110, and connected to a motor shaft of a motor of the mixer and configured to be rotated in a forward direction according to a rotation of the motor shaft; a forward rotation blade K1 fixedly provided on an upper side of the forward rotary shaft 120; a first bearing br1 axially installed on the forward rotary shaft 120; a central gear 130 axially installed on the forward rotary shaft 120 and configured to be rotated in the forward direction together with the forward rotary shaft 120; a plurality of horizontal insertion gears 141, 142, and 143 engaged with the central gear 130, provided at equal intervals to each other, and configured to be rotated in place in a reverse direction according to a rotation of the central gear 130, the reverse direction being opposite to a rotation direction of the central gear 130; a reverse rotor 160 having inner gear teeth 164 that are formed concentrically with the central gear 130 and are formed in a belt shape along an inner circumferential surface of the reverse rotor 160 in a circumferential direction, the inner gear teeth 164 being engaged with the plurality of horizontal insertion gears 141, 142, and 143 externally, thereby the reverse rotor 160 being configured to be rotated in the reverse direction according to a rotation of the horizontal insertion gears, the reverse direction being same as a rotation direction of the plurality of horizontal insertion gears 141, 142, and 143; a second bearing br2 axially installed on the reverse rotor 160 at a position between the reverse rotor 160 and the upper through-hole 111*a* of the housing 110; and a reverse rotation blade K2 installed on the reverse rotor 160 and configured to be rotated in the reverse direction together with the reverse rotor 160.

In the bidirectional simultaneous rotary blade bundle 100 for the mixer according to an embodiment of the present disclosure, between the central gear 130 and the inner gear teeth 164, the plurality of horizontal insertion gears 141, 142, and 143 is simultaneously engaged with both gear teeth 130*b* of the central gear 130 and the inner gear teeth 164, and arranged at equal intervals and arranged concentrically with the central gear 130, so that the plurality of horizontal insertion gears 141, 142, and 143 is configured to be rotated in the reverse direction according to the forward rotation of the central gear 130 and configured to rotate the inner gear teeth 164 in the same direction that is the reverse direction according to the reverse rotation of the plurality of horizontal insertion gears 141, 142, and 143.

Accordingly, there is a basic advantage in that the two rotary blades [the forward rotation blade K1 and the reverse rotation blade K2] are capable of being simultaneously rotated in opposite directions to each other by rotating only one forward rotary shaft 120 connected to one motor, and also there are key effects that occur as follows.

The horizontal insertion gears 141, 142, and 143, which are disposed between the central gear 130 and the inner gear teeth 164 so as to be engaged with both sides of the central gear 130 and the inner gear teeth 164, may rotate the inner gear teeth 164 in the same direction that is the rotation direction of the horizontal insertion gears 141, 142, and 143.

In particular, the plurality of horizontal insertion gears 141, 142, and 143 is arranged concentrically with the central gear 130 and arranged at equal intervals to each other, and simultaneously engaged with both the central gear 130 and the inner gear teeth 164 and disposed between the central gear 130 and the inner gear teeth 164, so that there is an advantage in that the reverse rotor 160 may be rotated without being eccentric.

Furthermore, by adopting only one type of power transmission member called the horizontal insertion gears 141, 142, and 143 between the central gear 130 and the reverse rotor 160, the number of operations of reverse direction power transmission may be minimized as one operation, and it is not necessary to adopt a reverse rotation gear fastened to a reverse rotor as the reverse rotation gear being adopt to the related art (Korean Patent No. 10-1862587), so that there is an advantage of reducing both the number of parts and an assembly time of a product.

In addition, the reverse rotor 160 has an inner side in contact with an outer side of the first bearing br1 and has an outer side in contact with an inner side of the second bearing br2, so that the reverse rotor 160 may be rotatably disposed between the first bearing br1 and the second bearing br2.

As illustrated in the drawings, a shaft hole 130*a* is formed at a center portion of the central gear 130 and the central gear 130 is axially installed on the forward rotary shaft 120, and the gear teeth 130*b* may be formed at an outer circumferential edge of the central gear 130.

The reference numeral 141*b*, 142*b*, 143*b* represent gear teeth of the horizontal insertion gears 141, 142, and 143, respectively.

In the bidirectional simultaneous rotary blade bundle 100 for the mixer according to an embodiment of the present disclosure, the central gear 130, the horizontal insertion gears 141, 142, and 143, and the inner gear teeth 164 are arranged in the same horizontal plane, and the horizontal insertion gears 141, 142, and 143 may be engaged with both the central gear 130 and the inner gear teeth 164, respectively.

In the bidirectional simultaneous rotary blade bundle 100 for the mixer according to an embodiment of the present disclosure, the horizontal insertion gears 141, 142, and 143 may preferably be three horizontal insertion gears 141, 142, and 143 configured to be provided at an interval of 120 degrees.

As described above, three horizontal insertion gears 141, 142, and 143 are provided at an interval of 120 degrees, so that there is an advantage in that a rotational balance may be automatically maintained with a relatively small number of gears.

In the bidirectional simultaneous rotary blade bundle 100 for the mixer according to an embodiment of the present disclosure, the housing 110 may include: a housing body 110A having the upper through-hole 111*a*; and a housing cover 110B having the lower through-hole 111*b* opposite the upper through-hole 111*a*, and screwed to the housing body 110A from a lower side of the housing body 110A for example by bolts, and insertion holes 141*a*, 142*a*, and 143*a* are formed at a center portion of each of the horizontal insertion gears 141, 142, and 143. In addition, the present disclosure may further include: shaft pins 171, 172, and 173 fastened to the housing cover 110B so as to be upright upward from the housing cover 110B, and inserted inside the insertion holes 141a, 142a, and 143a of the horizontal insertion gears 141, 142, and 143; and rotation holding members 151, 152, and 153 inserted between the shaft pins 171, 172, and 173 and inner circumferential surfaces of the insertion holes 141a, 142a, and 143a of the horizontal insertion gears 141, 142, and 143, respectively, and configured to allow the horizontal insertion gears 141, 142, and 143 to be rotated smoothly without being separated.

In the bidirectional simultaneous rotary blade bundle 100 for the mixer according to an embodiment of the present disclosure, the rotation holding members 151, 152, and 153 may be insertion bearings 151, 152, and 153 having inner rings fastened to the shaft pins 171, 172, and 173, respectively, and having outer rings fastened to the inner circumferential surfaces of the insertion holes 141a, 142a, and 143a of the horizontal insertion gears 141, 142, and 143, respectively.

As described above, by configuring the insertion bearings 151, 152, and 153 to be inside the horizontal insertion gears 141, 142, and 143, the present disclosure has advantages in that a rotation of the central gear 130 may be transferred to the horizontal insertion gears 141, 142, and 143 without a loss (maximizing a rotational efficiency) and a heat generation during the rotation of the horizontal insertion gears 141, 142, and 143 may be minimized. In addition, by minimizing the heat generation during the rotation, the present disclosure has an advantage of increasing durability of a product.

In the bidirectional simultaneous rotary blade bundle 100 for the mixer according to an embodiment of the present disclosure, support ribs 141c, 142c, and 143c bent inward so as to support a lower end of each of the outer ring of the insertion bearings 151, 152, and 153 may be formed at a lower end of each of the horizontal insertion gears 141, 142, and 143, and the outer ring of each of the insertion bearings 151, 152, and 153 is supported by the support ribs 141c, 142c, and 143c, respectively, so that the insertion bearings 151, 152, and 153 may be installed with being stably supported and without being separated from the horizontal insertion gears 141, 142, and 143.

On the other hand, the rotation holding members 151, 152, and 153 may be bushings (not illustrated) formed in a tube shape having inside surface fastened to the shaft pins 171, 172, and 173 and having outside surface fastened to the inner circumferential surface of each of the horizontal insertion gears 141, 142, and 143.

The bushings (not illustrated) are not illustrated, but the bushings having the tube shape may be rotated together with the horizontal insertion gears 141, 142, and 143.

The bidirectional simultaneous rotary blade bundle 100 for the mixer according to an embodiment of the present disclosure may further include a lower fixing plate 181, in which the lower fixing plate 181 is provided in close contact with the housing cover 110B, has a center portion formed with a lower hole 181a through which the forward rotary shaft 120 passes and communicating with the lower through-hole 111b, and has a plurality of lower fitting holes 181b to fixedly fit a lower side of the plurality of shaft pins 171, 172, and 173 such that the shaft pins 171, 172, and 173 are simultaneously fixed and the plurality of horizontal insertion gears 141, 142, and 143 is simultaneously restrained so as to simultaneously maintain a rotation balance of the plurality of horizontal insertion gears 141, 142, and 143.

The bidirectional simultaneous rotary blade bundle 100 for the mixer according to an embodiment of the present disclosure may further include an upper fixing plate 182, in which the upper fixing plate 182 has a center portion formed with an upper hole 182a through which the forward rotary shaft 120 passes, has a plurality of upper fitting holes 182b that correspond to the lower fitting holes 181b and fixedly fitted to an upper side of the plurality of shaft pins 171, 172, and 173 such that an upper end of each of the shaft pins 171, 172, and 173 is simultaneously fixed and the plurality of horizontal insertion gears 141, 142, and 143 is simultaneously restrained so as to simultaneously maintain the rotation balance of the plurality of horizontal insertion gears 141, 142, and 143.

In the present disclosure, since the plurality of horizontal insertion gears 141, 142, and 143 is simultaneously restrained by both the lower fixing plate 181 and the upper fixing plate 182, each of the horizontal insertion gears 141, 142, and 143 does not move independently and maintains the same predetermined distance at all times, so that there is an advantage of realizing a constant rotation balance.

In the bidirectional simultaneous rotary blade bundle 100 for the mixer according to an embodiment of the present disclosure, the shaft pins 171, 172, and 173 respectively have projecting rims 171b, 172b, and 173b projecting radially outward, the inner ring of each of the insertion bearings 151, 152, and 153 is supported by the projecting rims 171b, 172b, and 173b, and the lower fixing plate 181 may be fitted and fastened between a floor of the housing cover 110B and the projecting rims 171b, 172b, and 173b.

In addition, in order to increase a fastening force of the shaft pins 171, 172, and 173 to the insertion bearings 151, 152, and 153, the present disclosure may further include a snap ring 185 fastened between the shaft pins 171, 172, and 173 and the insertion bearings 151, 152, and 153.

Fastening holes 171a, 172a, and 173a are formed at the shaft pins 171, 172, and 173, respectively, and the fastening holes 171a, 172a, and 173a are screwed to the housing cover 110B by a fastening screw P1.

The bidirectional simultaneous rotary blade bundle 100 for the mixer according to an embodiment of the present disclosure may further include a first oil seal R1 having a ring shape, placed on the first bearing br1 at a position between the inner circumferential surface of the reverse rotor 160 and the forward rotary shaft 120, axially installed on the forward rotary shaft 120, and sealing the first bearing br1 to prevent leaking of oil. The reverse rotor 160 may include: a shaft tube portion 161 having a circular tube shape, protruding upward from a center of an upper surface of a rotor body 162, and allowing the forward rotary shaft 120 to be inserted inside and passing through thereof; the rotor body 162 flared radially outward such that the plurality of horizontal insertion gears 141, 142, and 143 and the central gear 130 are positioned therein and enveloped, and having the inner gear teeth 164 formed at a lower side of the inner circumferential surface thereof; and a locking end 163 bent inward from an upper end of the shaft tube portion 161 and locked and fixed to the first oil seal R1, in which a lower side of the rotor body 162 may be opened.

According to the configuration described above, the reverse rotor 160 is locked and fixed to the first oil seal R1 only, and is not necessary to have a separate fastening mechanism, so that there is an advantage of reducing both the number of parts and a volume of a product.

In the bidirectional simultaneous rotary blade bundle 100 for the mixer according to an embodiment of the present disclosure, the rotor body 162 of the reverse rotor 160 includes: an upper surface portion 162a flared outward and bent from the shaft tube portion 161; and a side surface portion 162b bent downward from the upper surface portion 162a, in which the lower portion of the rotor body 162 is opened and an inside space of the rotor body 162 is provided such that both the central gear 130 and the horizontal insertion gears 141, 142, and 143, are horizontally arranged with the inner gear teeth 164.

In addition, the present disclosure may further include an auxiliary bearing br3 axially installed on the forward rotary shaft 120 at a position below the first bearing br1 and provided at the housing cover 110B.

Each of the first oil seal R1 and the second oil seal R2 is formed of a resin, and more preferably formed of a silicone resin.

In addition, a mounting protrusion 113 is protrudingly formed at the upper through-hole 111a of the housing body 110A so as to be inserted inside a mounting hole 11a formed at a center portion of a floor portion 11 of the container 10.

Under this structure, the present disclosure may further include: a fastener 191 fastening both the housing 110 and the blade bundle 100 to the container 10 of the mixer by being screwed to the mounting protrusion 113; and the second oil seal R2 placed on the second bearing br2, axially installed on an outer circumferential surface of the reverse rotor 160, and sealing the second bearing br2 to prevent leaking of oil.

An operation of the bidirectional simultaneous rotary blade bundle 100 for the mixer having the above-described configuration according to an embodiment of the present disclosure will be described.

When the motor of the mixer rotates, the forward rotary shaft 120 axially installed on the motor rotates in the forward direction, and the forward rotation blade K1 rotates in the forward direction.

Figure 2:
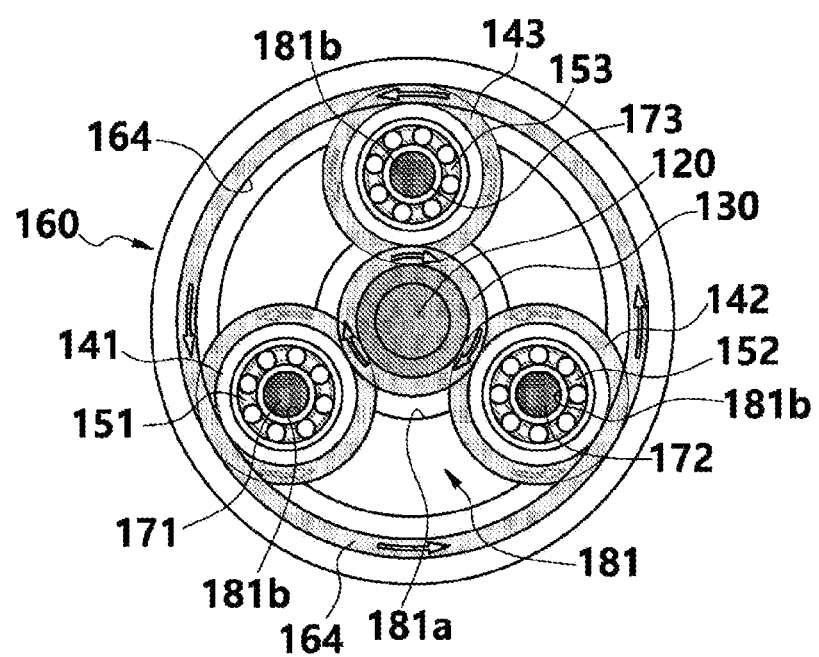
FIG. 2 is a schematic plan view for describing a rotary motion of a main portion of the bidirectional simultaneous rotary blade bundle 100 for the mixer according to an embodiment of the present disclosure.
Figure 3:
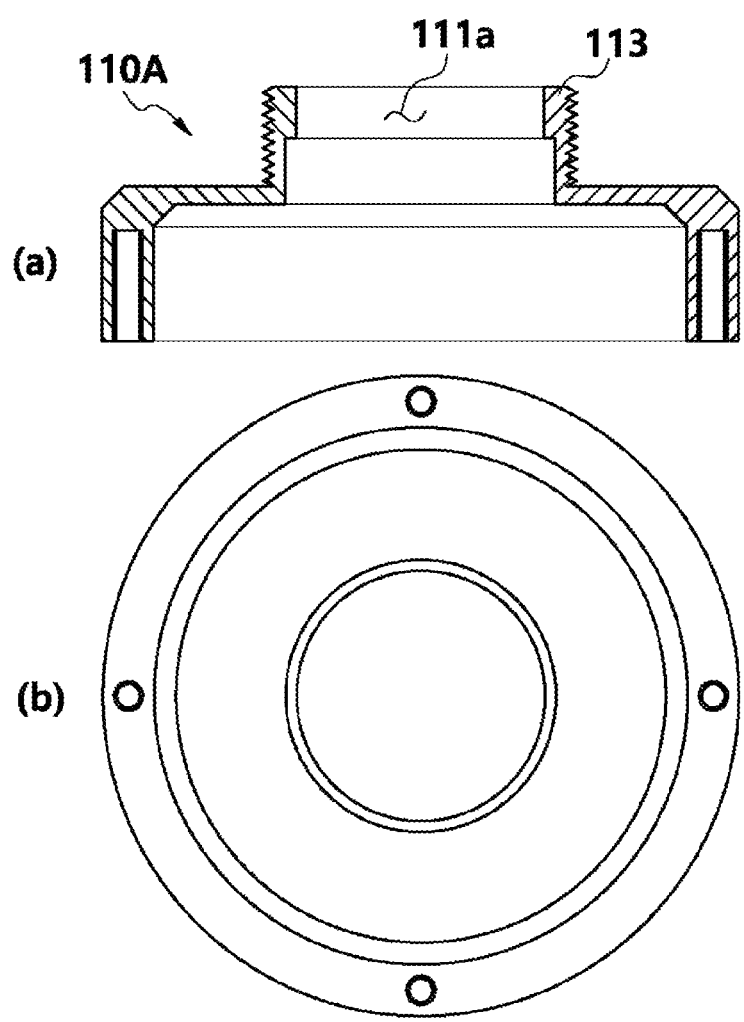
FIG. 3 shows configuration diagrams of a housing body 110A of the bidirectional simultaneous rotary blade bundle 100 for the mixer according to an embodiment of the present disclosure, in which FIG. 3(*a*) is a cross-sectional view of the housing body 110A and FIG. 3(*b*) is a bottom view of the housing body 110A.
Figure 4:
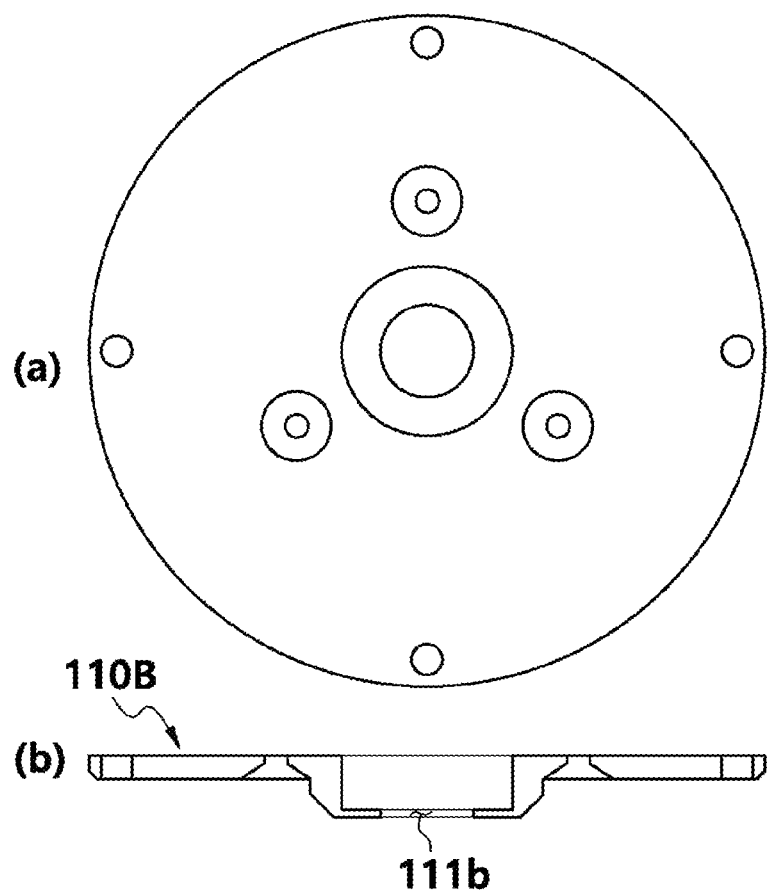
FIG. 4 shows configuration diagrams of a housing cover 110B of the bidirectional simultaneous rotary blade bundle 100 for the mixer according to an embodiment of the present disclosure, in which FIG. 4(*a*) is a cross-sectional view of the housing cover 110B and FIG. 4(*b*) is a plan view of the housing cover 110B.
Figure 5:
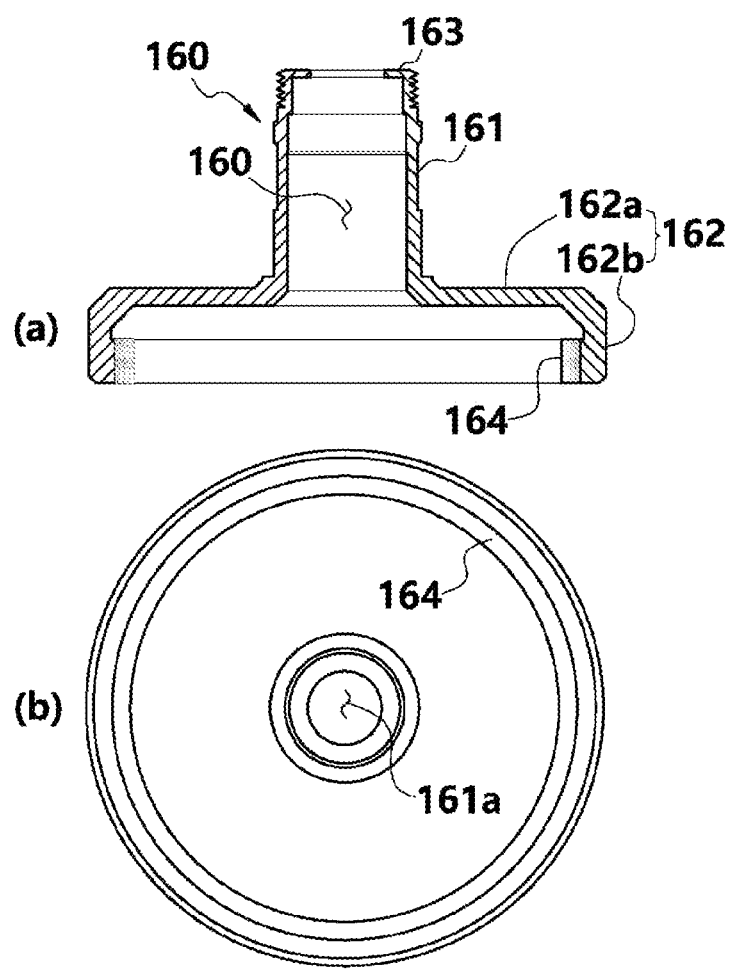
FIG. 5 shows configuration diagrams of a reverse rotor 160 of the bidirectional simultaneous rotary blade bundle 100 for the mixer according to an embodiment of the present disclosure, in which FIG. 5(*a*) is a cross-sectional view of the reverse rotor 160 and FIG. 5(*b*) is a plan view of the reverse rotor 160.
Figure 6:
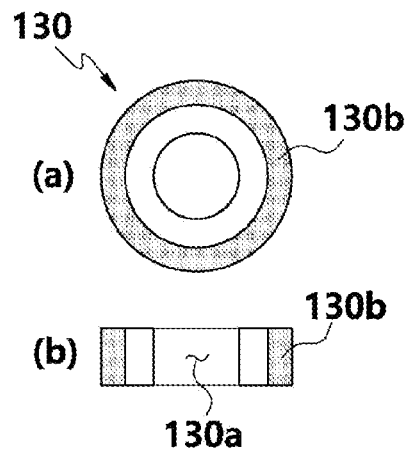
FIG. 6 shows configuration diagrams of a central gear 130 of the bidirectional simultaneous rotary blade bundle 100 for the mixer according to an embodiment of the present disclosure, in which FIG. 6(*a*) is a plan view of the central gear 130 and FIG. 6(*b*) is a cross-sectional view of the central gear 130.
Figure 7:
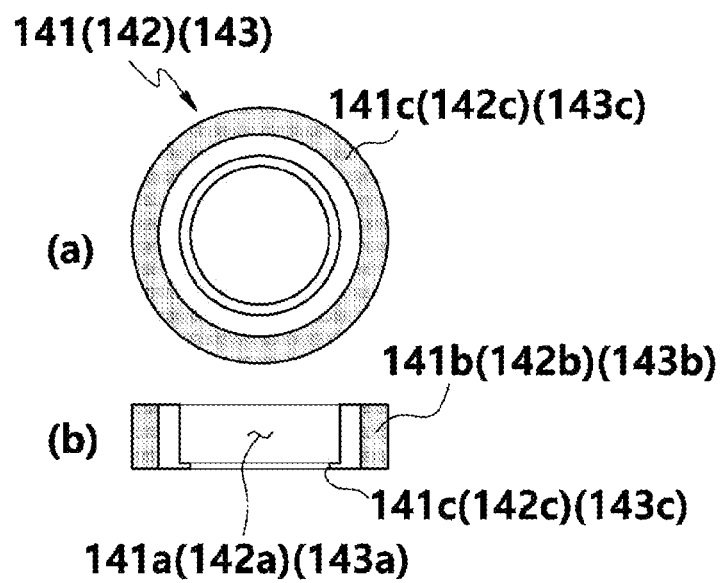
FIG. 7 shows configuration diagrams of horizontal insertion gears 141, 142, and 143 of the bidirectional simultaneous rotary blade bundle 100 for the mixer according to an embodiment of the present disclosure, in which FIG. 7(*a*) is a plan view of the horizontal insertion gears 141, 142, and 143 and FIG. 7(*b*) is a cross-sectional view of the horizontal insertion gears 141, 142, and 143.
Figure 8:
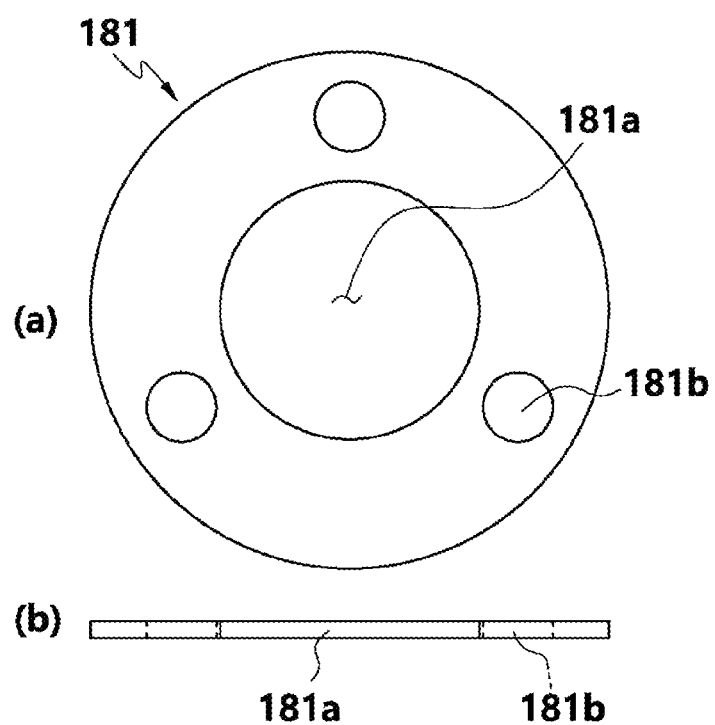
FIG. 8 shows configuration diagrams of an upper fixing plate 181 of the bidirectional simultaneous rotary blade bundle 100 for the mixer according to an embodiment of the present disclosure, in which FIG. 8(*a*) is a plan view of the upper fixing plate 181 and FIG. 8(*b*) is a cross-sectional view of the upper fixing plate 181.
Figure 9:
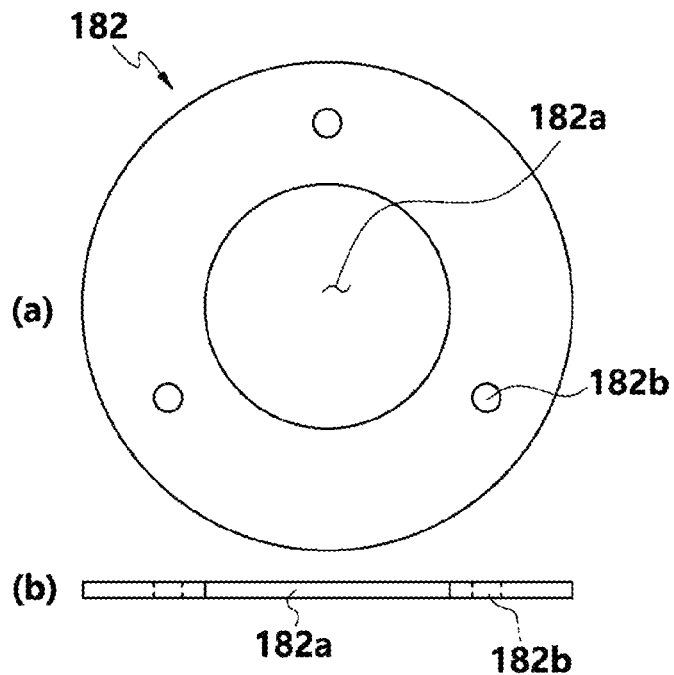
FIG. 9 shows configuration diagrams of a lower fixing plate 182 of the bidirectional simultaneous rotary blade bundle 100 for the mixer according to an embodiment of the present disclosure, in which FIG. 9(*a*) is a plan view of the lower fixing plate 182 and FIG. 9(*b*) is a cross-sectional view of the lower fixing plate 182.
Figure 10:
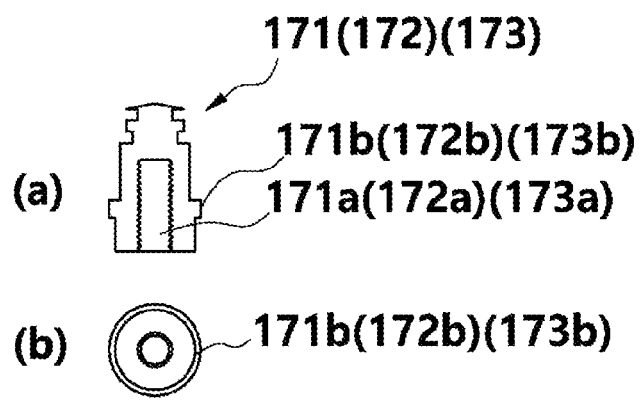
FIG. 10 shows configuration diagrams of shaft pins 171, 172, and 173 of the bidirectional simultaneous rotary blade bundle 100 for the mixer according to an embodiment of the present disclosure, in which FIG. 10(*a*) is a cross-sectional view of the shaft pins 171, 172, and 173 and FIG. 10(*b*) is a plan view of the shaft pins 171, 172, and 173.

As illustrated in FIG. 2, when the forward rotary shaft 120 rotates in the forward direction, the central gear 130 rotates in the forward direction, and the horizontal insertion gears 141, 142, and 143 are rotated in place in the reverse direction.

As described above, when the horizontal insertion gears 141, 142, and 143 rotate in place in the reverse direction, the horizontal insertion gears 141, 142, and 143 allow the inner gear teeth 164 simultaneously engaged with the horizontal insertion gears 141, 142, and 143 to be forcibly rotated in the reverse direction that is the same direction of which the horizontal insertion gears 141, 142, and 143 are rotated, so that the reverse rotor 160 is forcibly rotated in the reverse direction.

Therefore, the forward rotation blade K1 and the reverse rotation blade K2 simultaneously rotate in different directions to each other.

Meanwhile, In the bidirectional simultaneous rotary blade bundle 100 for the mixer according to an embodiment of the present disclosure, although the embodiment illustrates the configuration in which three horizontal insertion gears are provided, two horizontal insertion gears may be provided at an interval of 120 degrees, or four horizontal insertion gears may be provided at an interval of 90 degrees. Moreover, five horizontal insertion gears may be provided at an interval of 72 degrees, or six horizontal insertion gears may be provided at an interval of 60 degrees, and also belongs to the technical scope of the present disclosure.

The exemplary embodiments of the present disclosure have been examined as described above, and it will be clear to those skilled in the art that the present disclosure will be realized into a different specific form without departing from the spirit or scope of the present disclosure other than the above-described embodiments.

Accordingly, the above-described embodiments should be considered in a descriptive sense only and not for purposes of limitation, and the present disclosure is not limited to the above description and may also be changed within the scope of the appended claims and all equivalents falling within the scope.

The invention claimed is:

1. A bidirectional simultaneous rotary blade bundle for a mixer, the blade bundle comprising:
   a housing (110) having an upper through-hole (111a) and a lower through-hole (111b);
   a forward rotary shaft (120) installed through the housing (110) by passing through the upper through-hole (111a) and the lower through-hole (111b) of the housing (110), and connected to a motor shaft of a motor of the mixer and configured to be rotated in a forward direction according to a rotation of the motor shaft;
   a forward rotation blade (K1) fixedly provided on an upper side of the forward rotary shaft (120);
   a first bearing (br1) axially installed on the forward rotary shaft (120);
   a central gear (130) axially installed on the forward rotary shaft (120) and configured to be rotated in the forward direction together with the forward rotary shaft (120);
   a plurality of horizontal insertion gears (141, 142, and 143) engaged with the central gear (130), provided at equal intervals to each other, and configured to be rotated in place in a reverse direction according to a rotation of the central gear (130), the reverse direction being opposite to a rotation direction of the central gear (130);
   a reverse rotor (160) having inner gear teeth (164) that are formed concentrically with the central gear (130) and are formed in a belt shape along an inner circumferential surface of the reverse rotor (160) in a circumferential direction, the inner gear teeth (164) being engaged with the plurality of horizontal insertion gears (141, 142, and 143) externally, thereby the reverse rotor (160) being configured to be rotated in the reverse direction according to a rotation of the horizontal insertion gears (141, 142, and 143), the reverse direction being same as a rotation direction of the plurality of horizontal insertion gears (141, 142, and 143);
   a second bearing (br2) axially installed on the reverse rotor (160) at a position between the reverse rotor (160) and the upper through-hole (111a) of the housing (110); and
   a reverse rotation blade (K2) installed on the reverse rotor (160) and configured to be rotated in the reverse direction together with the reverse rotor (160),
   wherein the reverse rotor (160) has an inner side in contact with an outer side of the first bearing (br1) and has an outer side in contact with an inner side of the second bearing (br2), so that the reverse rotor (160) is configured to be rotated by being rotatably disposed between the first bearing (br1) and the second bearing (br2), and
   between the central gear (130) and the inner gear teeth (164), the plurality of horizontal insertion gears (141, 142, and 143) is simultaneously engaged with both gear teeth (130b) of the central gear (130) and the inner gear teeth (164), and the plurality of horizontal insertion gears (141, 142, and 143) is arranged at equal intervals, so that the plurality of horizontal insertion gears (141, 142, and 143) is configured to be rotated in the reverse direction according to the forward rotation of the central gear (130) and configured to rotate the inner gear teeth (164) in the same direction that is the reverse direction according to the reverse rotation of the plurality of horizontal insertion gears (141, 142, and 143).

2. The blade bundle of claim 1, wherein the central gear (130), the horizontal insertion gears (141, 142, and 143), and the inner gear teeth (164) are arranged to be positioned in a same horizontal plane, and the horizontal insertion gears (141, 142, and 143) are engaged with both the central gear (130) and the inner gear teeth (164), respectively.

3. The blade bundle of claim 2, wherein the housing (110) comprises:
   a housing body (110A) having the upper through-hole (111*a*); and
   a housing cover (110B) having the lower through-hole (111*b*) opposite the upper through-hole (111*a*),
      wherein insertion holes (141*a*, 142*a*, and 143*a*) are formed at a center portion of each of the horizontal insertion gears (141, 142, and 143), respectively, and
      wherein the blade bundle further comprises:
      shaft pins (171, 172, and 173) fastened to the housing cover (110B) so as to be upright upward from the housing cover (110B), and inserted inside the insertion holes (141*a*, 142*a*, and 143*a*) of the horizontal insertion gears (141, 142, and 143), respectively; and
      rotation holding members (151, 152, and 153) inserted between the shaft pins (171, 172, and 173) and an inner circumferential surface of each of the insertion holes (141*a*, 142*a*, and 143*a*) of the horizontal insertion gears (141, 142, and 143), respectively, and configured to allow the horizontal insertion gears (141, 142, and 143) to be rotated smoothly without being separated.

4. The blade bundle of claim 3, wherein the rotation holding members (151, 152, and 153) are formed of insertion bearings (151, 152, and 153) having inner rings fastened to the shaft pins (171, 172, and 173) and having outer rings fastened to the inner circumferential surfaces of the insertion holes (141*a*, 142*a*, and 143*a*) of the horizontal insertion gears (141, 142, and 143), respectively.

5. The blade bundle of claim 4, wherein support ribs (141*c*, 142*c*, and 143*c*) bent inward so as to support a lower end of the outer ring of each of the insertion bearings (151, 152, and 153) are formed at a lower end of each of the horizontal insertion gears (141, 142, and 143), respectively, and the outer ring of each of the insertion bearings (151, 152, and 153) is supported by the support ribs (141*c*, 142*c*, and 143*c*), so that the insertion bearings (151, 152, and 153) are installed with being stably supported and without being separated from the horizontal insertion gears (141, 142, and 143).

6. The blade bundle of claim 3, wherein each of the rotation holding members (151, 152, and 153) is formed of a bushing having an inside surface fastened to each of the shaft pins (171, 172, and 173) and having an outside surface fastened to each of the inner circumferential surfaces of the insertion holes (141*a*, 142*a*, and 143*a*) of the horizontal insertion gears (141, 142, and 143).

7. The blade bundle of claim 3, further comprising:
   a lower fixing plate (181) provided in close contact with the housing cover (110B), having a center portion formed with a lower hole (181*a*) through which the forward rotary shaft (120) passes and communicating with the lower through-hole (111*b*), and having a plurality of lower fitting holes (181*b*) to fixedly fit a lower side of the plurality of shaft pins (171, 172, and 173) such that the shaft pins (171, 172, and 173) are simultaneously fixed and the plurality of horizontal insertion gears (141, 142, and 143) is simultaneously restrained so as to simultaneously maintain a rotation balance of the plurality of horizontal insertion gears (141, 142, and 143); and
   an upper fixing plate (182) having a center portion formed with an upper hole (182*a*) through which the forward rotary shaft (120) passes, having a plurality of upper fitting holes (182*b*) fixedly fitted to an upper side of the plurality of shaft pins (171, 172, and 173) such that an upper end of each of the shaft pins (171, 172, and 173) is simultaneously fixed and the plurality of horizontal insertion gears (141, 142, and 143) is simultaneously restrained so as to simultaneously maintain the rotation balance of the plurality of horizontal insertion gears (141, 142, and 143).

8. The blade bundle of claim 7, wherein the shaft pins (171, 172, and 173) have projecting rims (171*b*, 172*b*, and 173*b*) projecting radially outward, the inner ring of each of the insertion bearings (151, 152, and 153) is supported by the projecting rims (171*b*, 172*b*, and 173*b*), and the lower fixing plate (181) may be fitted and fastened between a floor of the housing cover (110B) and the projecting rims (171*b*, 172*b*, and 173*b*).

9. The blade bundle of claim 3, further comprising a first oil seal (R1) having a ring shape, placed on the first bearing (br1) and axially installed on the forward rotary shaft (120), and sealing the first bearing (br1) to prevent leaking of oil, wherein the reverse rotor (160) comprises:
   a shaft tube portion (161) having a circular tube shape, protruding upward from a center of an upper surface of a rotor body (162), and allowing the forward rotary shaft (120) to be inserted inside and passing through thereof;
   the rotor body (162) flared radially outward such that the plurality of horizontal insertion gears (141, 142, and 143) and the central gear (130) are positioned therein and enveloped, and having the inner gear teeth (164) formed at a lower side of the inner circumferential surface thereof; and
   a locking end (163) bent inward from an upper end of the shaft tube portion (161) and locked and fixed to the first oil seal (R1),
   wherein a lower side of the rotor body (162) is opened.

10. The blade bundle of claim 9, wherein the rotor body (162) comprises:
    an upper surface portion (162*a*) flared outward and bent from the shaft tube portion (161); and
    a side surface portion (162*b*) bent downward from the upper surface portion (162*a*),
    wherein the lower side of the rotor body (162) is opened and an inside space of the rotor body (162) is provided such that both the central gear (130) and the horizontal insertion gears (141, 142, and 143) are horizontally arranged with the inner gear teeth (164).

\* \* \* \* \*